(12) United States Patent
Thuillier et al.

(10) Patent No.: US 11,281,756 B2
(45) Date of Patent: Mar. 22, 2022

(54) METHOD OF CLASSIFICATION OF AN INPUT IMAGE REPRESENTATIVE OF A BIOMETRIC TRAIT BY MEANS OF A CONVOLUTIONAL NEURAL NETWORK

(71) Applicant: Idemia Identity & Security France, Courbevoie (FR)

(72) Inventors: Cédric Thuillier, Courbevoie (FR); Fantin Girard, Courbevoie (FR)

(73) Assignee: IDEMIA IDENTITY AND SECURITY FRANCE, Courbevoie (FR)

( * ) Notice: Subject to any disclaimer, the term of this patent is extended or adjusted under 35 U.S.C. 154(b) by 238 days.

(21) Appl. No.: 16/676,570

(22) Filed: Nov. 7, 2019

(65) Prior Publication Data
US 2020/0151309 A1    May 14, 2020

(30) Foreign Application Priority Data
Nov. 8, 2018   (FR) ...................................... 1860323

(51) Int. Cl.
*G06F 21/32*    (2013.01)
*G06K 9/62*    (2022.01)
(Continued)

(52) U.S. Cl.
CPC .............. *G06F 21/32* (2013.01); *G06F 17/18* (2013.01); *G06K 9/6267* (2013.01); *G06N 3/0454* (2013.01); *G06N 3/08* (2013.01)

(58) Field of Classification Search
CPC ....... G06F 21/32; G06F 17/18; G06K 9/6267; G06N 3/0454; G06N 3/08
See application file for complete search history.

(56) References Cited

U.S. PATENT DOCUMENTS

2017/0262736 A1\*  9/2017  Yu ......................... G06K 9/6269
2018/0247184 A1    8/2018  Lannes et al.
2019/0385056 A1\*  12/2019  Girard ................ G06K 9/00892

FOREIGN PATENT DOCUMENTS

EP    3367299 A1    8/2018

OTHER PUBLICATIONS

Zhong, Y., Chen, J., Huang, B., 'Towards End-to-End Face Recognition through Alignment Learning', arxiv. org, Cornell University Library, 2017, pp. 1-10, DOI: 10.1109/LSP.2017.2715076.
(Continued)

*Primary Examiner* — Utpal D Shah
(74) *Attorney, Agent, or Firm* — Womble Bond Dickinson (US) LLP

(57) ABSTRACT

The present invention concerns a method of classification of an input image representative of a biometric trait by means of a first convolutional neural network, CNN, characterized in that it comprises the implementation by data processing means (21) of a client (2) of steps of:
(c) Estimation of a transformation parameter vector of said input image, by means of a second CNN, the parameters of the vector being representative of a geometric transformation enabling the biometric trait represented by the input image to be registered in a common reference frame;
(d) Application to said input image of a transformation defined by said estimated transformation parameter vector, so as to obtain a registered input image;
(e) Classification of the registered input image by means of the first CNN.

17 Claims, 5 Drawing Sheets

(51) Int. Cl.
*G06N 3/04* (2006.01)
*G06N 3/08* (2006.01)
*G06F 17/18* (2006.01)

(56) References Cited

OTHER PUBLICATIONS

Detlefsen, N.S., Freifeld, O., Hauberg, S., 'Deep Diffeomorphic Transformer Networks', 2018 IEEE/CVF Conference on Computer Vision and Pattern Recognition (CPVR), IEE, 2018, pp. 4403-4412, DOI: 10 1109/CVPR.2018.00463.

Schuch, P., May, J. M., Busch, C., 'Unsupervised Learning of Fingerprint Rotations', 2018 International Conference of the Biometrics Special Interest Group (BIOSIG), Gesellschaft Fuer Informatik, 2018, pp. 1-6, DOI: 10.23919/BIOSIG.2018.8553096.

Correspondence from the French National Institute of Industrial Property (INPI) for FR1860323 dated Aug. 12, 2019, and Preliminary Search Report of the French National Institute of Industrial Property (INPI) for FR1860323 dated Jul. 31, 2019.

* cited by examiner

METHOD OF CLASSIFICATION OF AN INPUT IMAGE REPRESENTATIVE OF A BIOMETRIC TRAIT BY MEANS OF A CONVOLUTIONAL NEURAL NETWORK

CROSS-REFERENCE TO RELATED APPLICATIONS

This application claims the benefit of France Patent Application No. 1860323 filed Nov. 8, 2018, the disclosure of which is herein incorporated by reference in its entirety.

GENERAL TECHNICAL FIELD

The present invention relates to the field of biometrics, and in particular, proposes a method of classification of an input image representative of a biometric trait by means of at least one convolutional neural network, as well as a method of training the convolutional neural network(s).

STATE OF THE ART

Neural networks are massively used for data classification.

After an automatic training phase (generally supervised, meaning on an already classified reference database), a neural network "learns" and becomes capable on its own of applying the same classification to unknown data.

Convolutional neural networks (CNN) are a type of neural network wherein the connection pattern between neurons is inspired by the visual cortex of animals. They are therefore particularly suited to a specific type of classification, which is image analysis, indeed, they allow efficient recognition of people or objects in images or videos, in particular in security applications (automatic surveillance, threat detection, etc.).

Quite specifically, the use of CNN is known in the field of biometric authentication/identification. In fact, a CNN can be trained to recognize an individual on the basis of biometric traits of this individual such as fingerprints (fingerprint recognition), iris or face (facial recognition). Insofar as these data are manipulated in image form, the CNN proves very effective.

Conventional biometric approaches use characteristic information of the biometric trait extracted from the acquired biometry, called features, and the training/classification is done on the basis of the comparison of these characteristics.

In particular, in the case of fingerprint recognition, fingertip images are processed so as to extract the features of a print that can be classified into three categories:
- Level 1 defines the general pattern of that print (one of four classes: right loop, left loop, arch and spiral), and the overall layout of the ridges (in particular, an orientation map called "Ridge Flow Matrix"—RFM map—is obtained, which represents the general direction of the ridge at each point of the print).
- Level 2 defines the particular points of the prints called minutia, which constitute "events" along the ridges (end of a ridge, bifurcation, etc.). The conventional recognition approaches essentially use these features.
- Level 3 defines more complex information such as the shape of the ridges, pores of the skin, scars, etc.

The method of extracting features from a print (in the form of feature maps) is called "encoding," which make it possible to compose a signature called "template" encoding the useful information in the final phase of classification. More specifically, classification will be done by comparing feature maps obtained with one or more reference feature maps associated with known individuals.

It would be desirable to avoid the encoding phase and go directly to performing the training/classification on the basis of biometric data, i.e. representing the biometrics by a reduced vector without the need to explicitly extract the features.

Recent approaches in the field of deep training have made such major advances possible, particularly in the field of facial recognition: the training/classification can be performed directly on the basis of facial photographs.

The application of such approaches to digital recognition runs up against specifics inherent in fingerprints and until now the performance has not been persuasive. In particular, CNNs require a larger volume of training data.

Indeed, although facial images are always acquired in a relatively standardized way (under nearly the same lighting conditions), this is not always the case for prints, and particularly prints called latent, for example those found at a crime scene. Two images of prints of the same identity can have strong rotations relative to each other, occultations as well as a set of distortions.

Proposed in patent application FR1855170 is a particular increase of training data comprising the application of geometric and/or intensity transformations so as to create multiple "altered" occurrences of the input data.

This effectively improves the robustness of the deformations, but it is still difficult to work on prints of unknown orientation and it is desirable to further improve performance.

BRIEF DESCRIPTION OF THE INVENTION

According to a first aspect, the present invention relates to a method of classification of an input image representative of a biometric trait by means of a convolutional neural network, CNN, characterized in that it comprises the implementation by data processing means of a client, of steps of:
(c) Estimation of a transformation parameter vector of said input image, by means of a second CNN, the parameters of the vector being representative of a geometric transformation enabling the biometric trait represented by the input image to be registered in a common reference frame;
(d) Application to said input image of a transformation defined by said estimated transformation parameter vector, so as to obtain a registered input image;
(e) Classification of the registered input image by means of the first CNN.

According to other advantageous and nonlimiting characteristics:
said biometric traits are chosen from among fingerprints, faces and irises, particularly fingerprints;
said transformation parameters comprise at least one set of deformation coefficients each associated with a reference nonlinear deformation function from a family of reference nonlinear deformation functions, said transformation defined by said estimated transformation parameters vector comprising a deformation expressed from said family of reference nonlinear deformation functions and associated coefficients;
said reference nonlinear deformation functions are velocity fields, said deformation being expressed in the form of a diffeomorphic distortion field as an exponential of a linear combination of the velocity fields weighted by said associated coefficients;

said transformation parameters further comprise a rotation parameter and/or a change of scale parameter and/or at least one translation parameter;

said transformation defined by said estimated transformation parameters vector comprises a composition of said deformation with an affine transformation expressed from corresponding transformation parameters;

The method comprises the preliminary implementation of steps (a) of estimation of a vector of parameters that are descriptive of a singular point of the biometric trait in said input image, by means of a third CNN, and (b) reframing said input image based on estimated parameters of said singular point, so that the parameters of said singular point have predetermined values for the reframed input image; steps (c) and (d) being carried out on the reframed input image;

said transformation parameters comprise at least one coordinate of the singular point and an angle of the singular point, said reframing of the input image comprising a translation and/or a rotation;

the method comprises a prior training step (a0), by data processing means of a server, from a database of training images already classified, from parameters of said first and second CNNs;

the first and second CNNs are trained simultaneously and semi-supervised, the training images from the database of training images not being associated with transformation parameters;

step (a0) also comprises the training of the third CNN, the training images from the database of training images being associated with parameters that are descriptive of a singular point;

the training of the first and second CNNs comprises, for at least one training image from said training image database, the retrieval of a registered training image, the classification of the registered training image, and the minimization of a loss function;

Step (a0) preliminarily comprises the statistical analysis of said database of already classified training images, so as to determine said family of nonlinear deformation reference functions by which transformations observed in the training database can be expressed based on a set of coefficients;

said transformations observed in the training database are nonlinear transformations with which to map from one member of a training data pair to the other where the pair is representative of a single biometric trait;

said statistical analysis is a main component analysis on all the distortion fields expressing the transformations observed in the training database, the reference nonlinear deformation functions being determined from eigenvectors produced from the main component analysis;

said biometric trait represented by the input image is that of an individual, step (e) being a step of identification or authentication of said individual.

According to a second and third aspect, the invention proposes a computer program product comprising code instructions for the execution of a method according to the first aspect of classification of an input image representative of a biometric trait by means of a first convolutional neural network, CNN; and a storage means readable by computer equipment on which a computer program product comprises code instructions for executing a method according to the first aspect of classification of an input image representative of a biometric trait by means of a convolutional neural network, CNN.

DESCRIPTION OF THE FIGURES

Other characteristics and advantages of the present invention will appear upon reading the following description of a preferred embodiment. This description will be given with reference to the attached drawings in which.

DETAILED DESCRIPTION

Architecture

According to two complementary aspects of the invention, the following is proposed:
  a method of classification of an input image representative of a biometric trait by means of at least one convolutional neural network (CNN);
  a method of training parameters of the CNN(s).

The classification CNN will be designated as a first CNN, since, as shown below, a second CNN, and even a third CNN are also going to be used.

Figure 1:
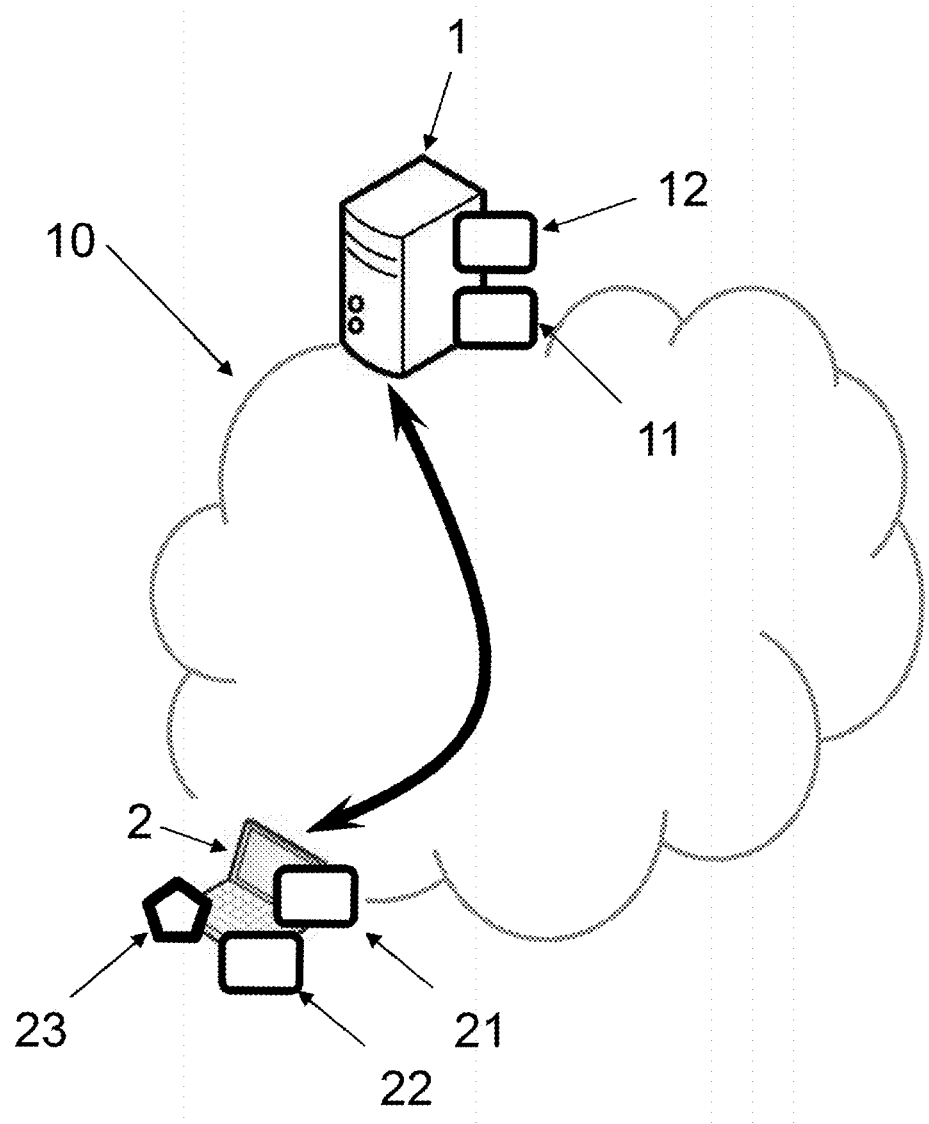
FIG. 1 is a diagram of an architecture for implementation of the method according to the invention.

The present methods are implemented within an architecture such as shown in FIG. 1, with a server 1 and a client 2. The server 1 is the training device (implementing the training method) and the client 2 is a classification device (implementing the classification method), for example a user terminal. It is entirely possible that the two devices 1, 2 are the same.

In any case, each device 1, 2 is typically a remote computer equipment connected to an extended network 10 such as the Internet for the exchange of data. Each comprises data processing means 11, 21 of processor type and data storage means 12, 22 such as computer memory, for example a drive.

The server 1 stores a training database, i.e. a set of already classified data (in contrast to the data described as input, which is in fact to be classified).

In fact, the input or training data are image type, and are representative of a biometric trait (in other words it involves images of the biometric trait, i.e. on which the biometric trait is visible), advantageously chosen from a fingerprint, a face and an iris of a user, and preferably a fingerprint (as will be seen, the present method is specifically effective in this last case). Said classification is then respectively of finger recognition of the user (e.g. authentication or identification of the individual by recognition of their fingerprint). Conventionally, such a training database comprises several representative data of a single biometric trait, i.e. representing the same identity, for example several occurrences of the same fingerprint but acquired slightly differently.

It should be noted that it is possible that said images represent more than the biometric trait, and particularly a "template" as can be seen in the figures for the latent fingerprints, which are simply photographed in situ, the template allowing to have a scale. The template is an element of the image that will certainly be able to be used by the CNNs.

CNN

A CNN generally comprises four types of layers successively processing information:
- the convolution layer which processes blocks from the input one after the other;
- the nonlinear layer with which to add nonlinearity to the network and therefore to have much more complex decision functions;
- the pooling layer with which to combine several neurons into a single neuron;
- The fully connected layer which connects all the neurons from one layer to all the neurons of the preceding layer.

The non-linear layer NL activation function is typically the ReLU function (Rectified Linear Unit) which is equal to $f(x)=\max(0, x)$ and the most used pooling layer (labeled POOL) is the function MaxPool2×2 which corresponds to a maximum among four values of a square (four values are pooled into one).

The convolution layer, labeled CONV, corresponds to the convolution operation, and the fully connected layer, labeled FC, generally corresponds to a scalar product between the neurons of the preceding layer and the weights from the CNN.

Typical CNN architectures stack several pairs of CONV→NL layers and then add a POOL layer and repeat this plan [(CONV→NL)$^p$→POOL] until getting a sufficiently small size output vector, and then ending by two fully connected FC layers.

This is a typical CNN architecture:
INPUT→[[CONV→NL]$^p$→POOL]$^n$→FC→FC

Each of the first, second and/or third CNNs will be able to have said typical architecture.

More specifically, the first CNN can have the following architecture, for example: INPUT→[[NL→CONV (1×1) →NL→CONV (3×3)]$^p$→CONV→POOL]$^n$→FC→FC, where 1×1 and 3×3 designate filter sizes of the convolution layers. Each of the outputs p of the block [[NL→CONV (1×1)→NL→CONV (3×3)] is concatenated and input to the CONV→POOL block.

The second CNN can follow the above-mentioned typical architecture with a hyperbolic tangent activation function at the output.

Finally, the third CNN in particular takes an encoder-decoder like architecture that outputs a map enabling the singular point or points to be obtained. The image is "encoded" through a first INPUT→[[CONV→NL]$^p$→POOL]$^n$ part. Said encoding part reduces the size of the image or feature maps by the POOL operation. Then the output of the encoding part is placed at the input of a part called decoding [[CONV→NL]$^p$→UPSCALE]$^n$, which increases the sizes of the feature maps again until the probability map is obtained. This increase in size is achieved by a re-dimensioning layer called UPSCALE.

Principle

The idea of the present method is to use not only the first classification CNN, but one or two CNNs for "pre-processing" the biometric trait images so that the first CNN has a "registered" input image easy to classify, i.e. having undergone a geometric transformation making it possible to correct any irregularities such as rotations, occultations or distortions. In other words, the registered image is a rectified, corrected image.

"Registering" means transforming an input image into a registered image theoretically free of irregularities. In particular, the biometric trait represented by the input image is registered to a "common reference frame" enabling the represented biometric traits to be compared.

Conceptually, the registered image is one that theoretically would have been obtained if the biometric trait had been acquired under standardized conditions, i.e. an image that is not deformed (acquired quite flat), in the proper scale, properly oriented, and particularly one that can be found in an official database of images of biometric traits for identification/authentication purposes. It is understood that "proper orientation", i.e. the common reference frame that can be described as reference orientation, corresponds to an orientation chosen arbitrarily wherein the finger is oriented vertically and upwards, called "North-South" position, i.e. the natural orientation whereupon the finger is pressed upon a sensor under good conditions, which corresponds to the normal orientation of official image databases. To restate this, the reference orientation is preferably fixed relative to the orientation of the finger, in particular equal to the orientation of the finger, but it will be understood that it is possible to start with any reference orientation.

The idea of "registration" therefore is understood as the inverse transformation enabling this theoretical image to be found and in particular to "un-distort" the input image. As shown below, the registration transformation can combine a linear transformation (affine transformation) and a nonlinear transformation (deformation).

It will be seen hereafter how to simply and effectively train a CNN capable of registering a biometric trait image as follows.

As concerns the CNN's:
- the first CNN, called classification CNN, is the one through which an input image, particularly one that is registered, is associated with a class, i.e. an identity of the possessor of the represented biometric trait.
- the second CNN, called registration CNN, allows to estimate a vector of transformation parameters defining the transformation to be applied to the input image in order to obtain the registered image;
- the optional third CNN, called reframing CNN, enables a potential "pre-registration", as shown below, simplifying the work of the second CNN. More specifically, the third CNN estimates a descriptive parameters vector of a singular point of the biometric trait represented in the input image, so as to reframe the input image so that the vector of descriptive parameters takes predetermined values. This will be explained in more detail below.

Registration Transformation

As explained, registration transformation is understood as a geometric transformation the parameters whereof are estimated by the second CNN, i.e. the combination of a linear transformation and/or a non-linear transformation, i.e. $T=T_L \circ T_N L$.

The linear component $T_L$ of the transformation, i.e. the affine transformation, corresponds to a combination of a rotation and/or a translation and/or a change of scale. It is defined by up to four parameters (a, s, dx, dy) of the transformation parameter vector, wherein α is the angle of rotation (oriented) to be applied, s the scale change coefficient to be applied, and dx, dy the translation in accordance with the horizontal and vertical axes.

From these parameters, the affine transformation can be expressed by the $$\text{function } T_L = \begin{pmatrix} s \cdot \cos(\alpha) & -\sin(\alpha) & dx \\ \cos(\alpha) & s \cdot \sin(\alpha) & dy \end{pmatrix}.$$

It will be understood that the invention is not limited to this list of affine transformation parameters, and that the transformation estimated by the second CNN can even be limited to a purely non-linear transformation, in particular when a third CNN is used.

The nonlinear component $T_N L$ of the transformation, simply called deformation, corresponds to the rest of the transformation that cannot be expressed as an affine.

In this regard, said transformation parameters advantageously comprise at least one set of k deformation coefficients (k In the range of a few coefficients, particularly between 2 and 10, and for example 5) ($c_0 \ldots c_{k-1}$) each associated with a reference nonlinear deformation function $E_{i, i \in [0; k-1]}$ of a family of ($E_0 \ldots E_{k-1}$) reference nonlinear deformation functions. In other words, $T_{NL} = f(c_0 \ldots E_{k-1})$.

Preferably, said reference nonlinear deformation functions are velocity fields, said deformation being expressed in the form of a diffeomorphic distortion field as an exponential of a linear combination of the velocity fields weighted by said associated coefficients.

More specifically, assuming that $T_N L$ is a diffeomorphic distortion field, there is a velocity field v such that $T_N L = \exp(v)$, and said family of reference nonlinear deformation functions provides a basis by which to express any velocity field as a linear combination, i.e. $v = \Sigma_{i=0}^{k-1} c_i E_i$. In one embodiment, the deformation coefficients can be seen as the "coordinates" of the velocity field in the database formed by the family of reference nonlinear deformation functions.

It will be understood that said family can be predefined, yet, alternatively, it will be seen further how to generate it in an optimal way with regard to the learning database.

The combination of the two linear and nonlinear transformations makes it possible to construct a global transformation function $$T = \begin{pmatrix} s \cdot \cos(\alpha) & -\sin(\alpha) & dx \\ \cos(\alpha) & s \cdot \sin(\alpha) & dy \end{pmatrix} \circ \exp\left(\sum_{i=0}^{k-1} c_i E_i\right),$$

defined by a vector of k+4 transformation parameters.

Figure 2:
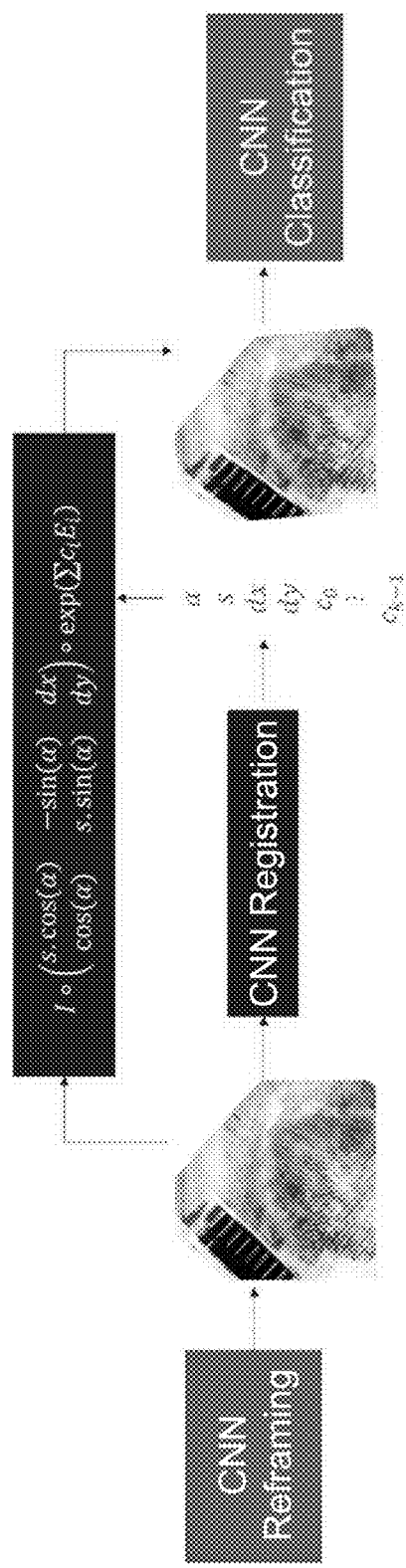
FIG. 2 shows the registration of an input image in a preferred embodiment of the method according to the invention.

With reference to FIG. 2, the application of said transformation to an input image (possibly already reframed by the third CNN) makes it possible to obtain said registered image on which the first CNN can be used for classification.

Reframing

As explained, the reframing transformation can comprise a rotation and a translation, but normally they must be minimal. However, it is possible that the trait represented by the input image has a completely unfamiliar orientation resulting only in the lack of knowledge of the reference in which the image was acquired (for example latent print on a crime scene, as explained).

Preferably, the third CNN allows to reframe the input image by searching for a "singular point" of the biometric trait, typically the point of strongest curvature of the fingerprint, but a core or delta of the fingerprint can also be mentioned. For other biometric traits such as the face, the tip of the nose can be mentioned for example.

The third CNN estimates a vector of descriptive parameters of a singular point of the biometric trait represented in the input image. Said descriptive parameters preferably comprise a coordinate of the singular point (two in particular) and an angle of the singular point. "Angle" of the singular point is understood as a direction defined by said singular point, materialized by a vector (and possibly expressed by an angular offset oriented relative to an arbitrary direction, for example the vertical direction). The objective of said angle is to be able to orient the prints in a common manner.

Figure 3:
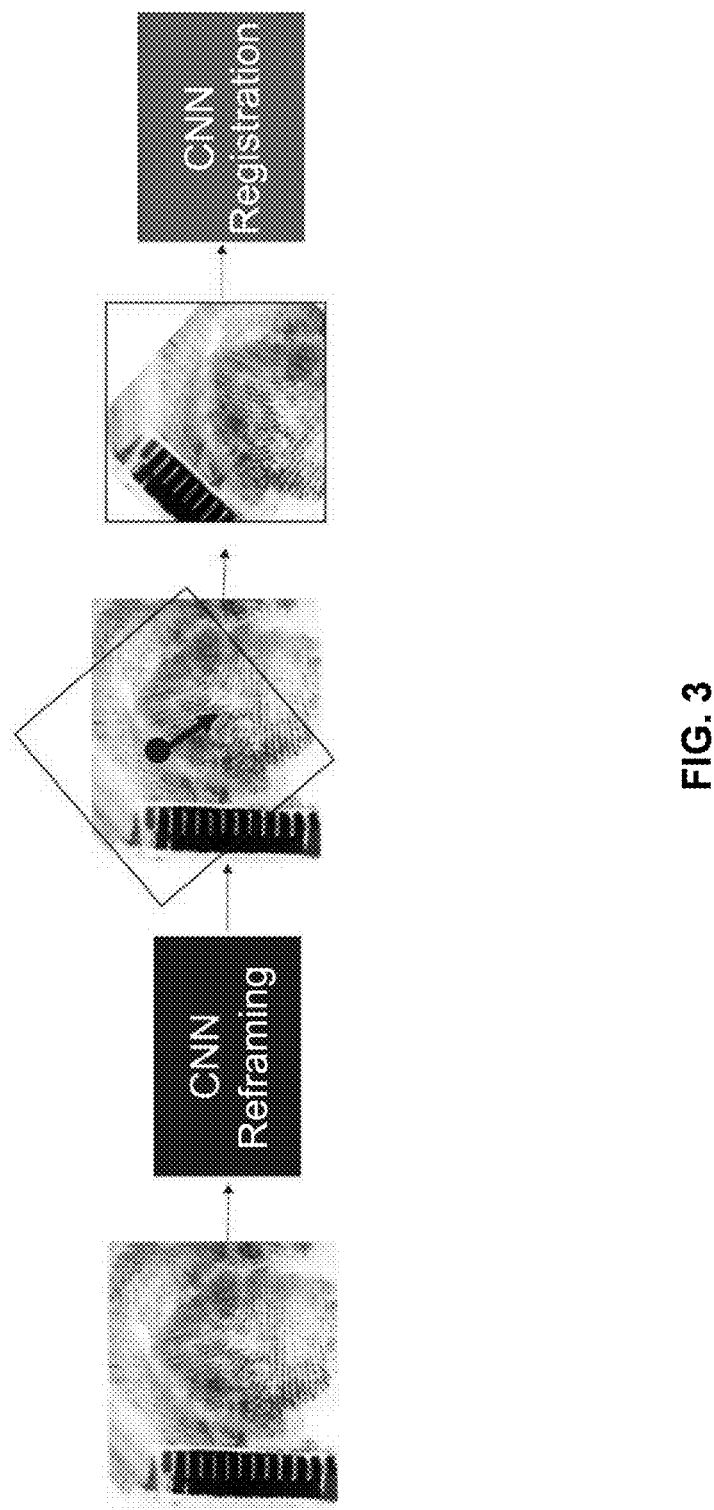
FIG. 3 shows the registration of an input image in a preferred embodiment of the method according to the invention.

With reference to FIG. 3, knowledge of the descriptive parameters of the input image makes it possible to generate the reframed image as being that in which the descriptive parameters take predetermined values, i.e. the singular point is a predetermined position (for example at the center of the reframed image) and the direction of the singular point is downward (for example in order to find an acquisition with the vertical finger, i.e. the angular offset between the direction of the singular point and the vertical direction is zero). Reframing is therefore a combination of a translation and/or a rotation.

In other words, the input image is preferably reframed in the box aligned on the angle of the singular point, which center is the same singular point.

Classification

Figure 4:
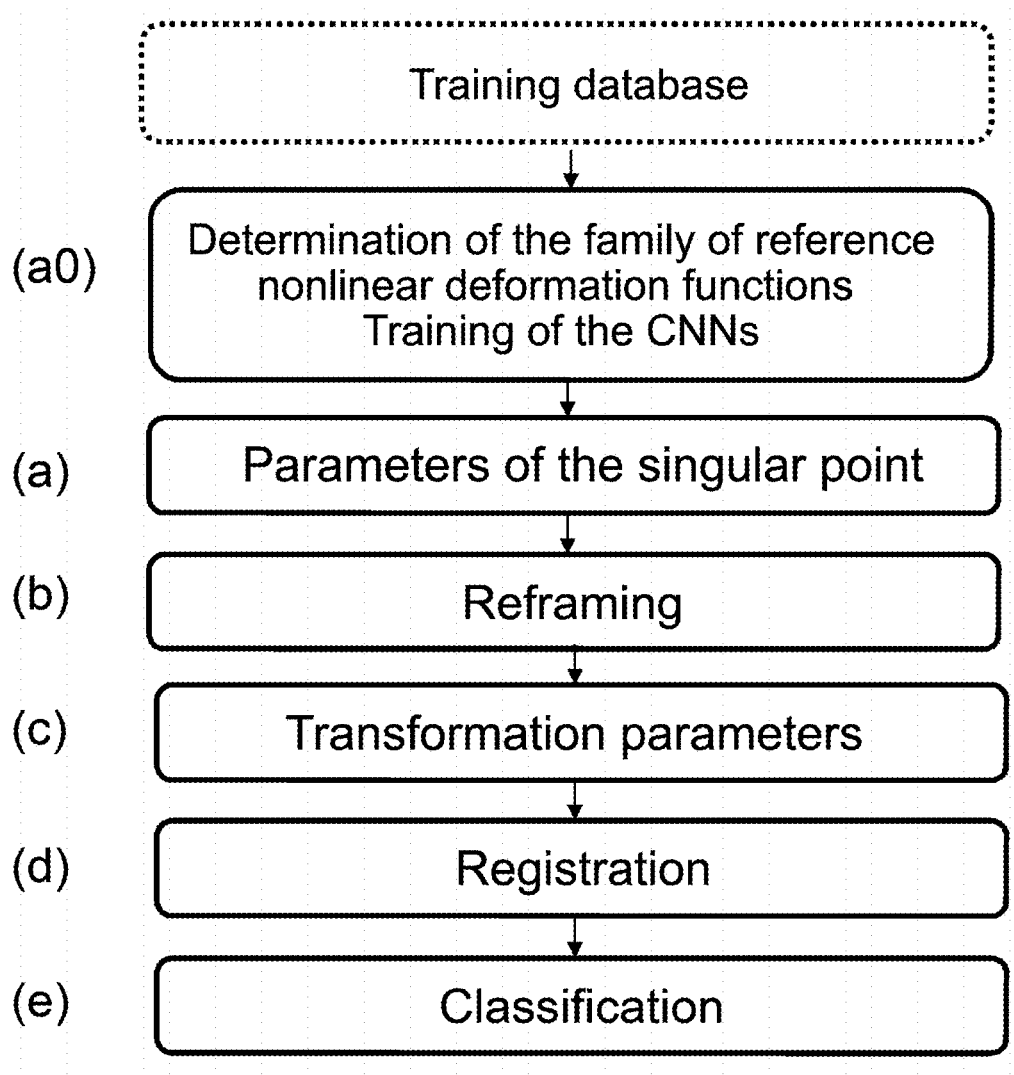
FIG. 4 shows the steps of a preferred embodiment of a method according to the invention.

With reference to FIG. 4, advantageously the method begins by a training step (a0), by the data processing means 11 of the server 1, from a database of images of already classified biometric traits, from CNNs. This training will be described in detail further on.

The trained CNNs can be stored as necessary on data storage means 22 of the client 2 for use in orientation estimation. It should be noted that the same CNNs can be embedded on numerous clients 2; only one training is necessary.

The classification per se of an input image representative of a biometric trait comprises the implementation by data processing means 21 of the client 2; it begins by optional steps (in case of third CNN) of (a) estimation of a descriptive parameters vector of a singular point (typically two coordinates and an angle) of the biometric trait in said input image, by means of the third CNN, and (b) reframing of said input image (rotation/translation) based on estimated parameters of said singular point, in such a way that the parameters of said singular point have for the reframed input image predetermined values (for example centered singular point, and zero angle relative to the vertical).

The reframed input image is then obtained.

Next, in a step (c) a transformation parameter vector is estimated of said reframed input image (or directly from the original input image in the absence of steps (a) and (b)) for registration, by means of the second CNN, then in a step (d) the transformation defined by said estimated transformation parameter vector is applied to said reframed input image (or directly to the original input image in the absence of steps (a) and (b)), so as to obtain a registered input image.

Finally, in a step (e) the registered input image is classified by means of the first CNN so as to determine the identity of the individual having the biometric trait represented by the input image, for authentication/identification of said user.

Training

Training of the first, second and/or third CNNs is understood conventionally as the determination of the parameters (the weights) of said networks.

As explained, the server 1 stores a training database, i.e. a set of already classified data (in contrast to the data described as input, which is in fact to be classified).

Figure 5:
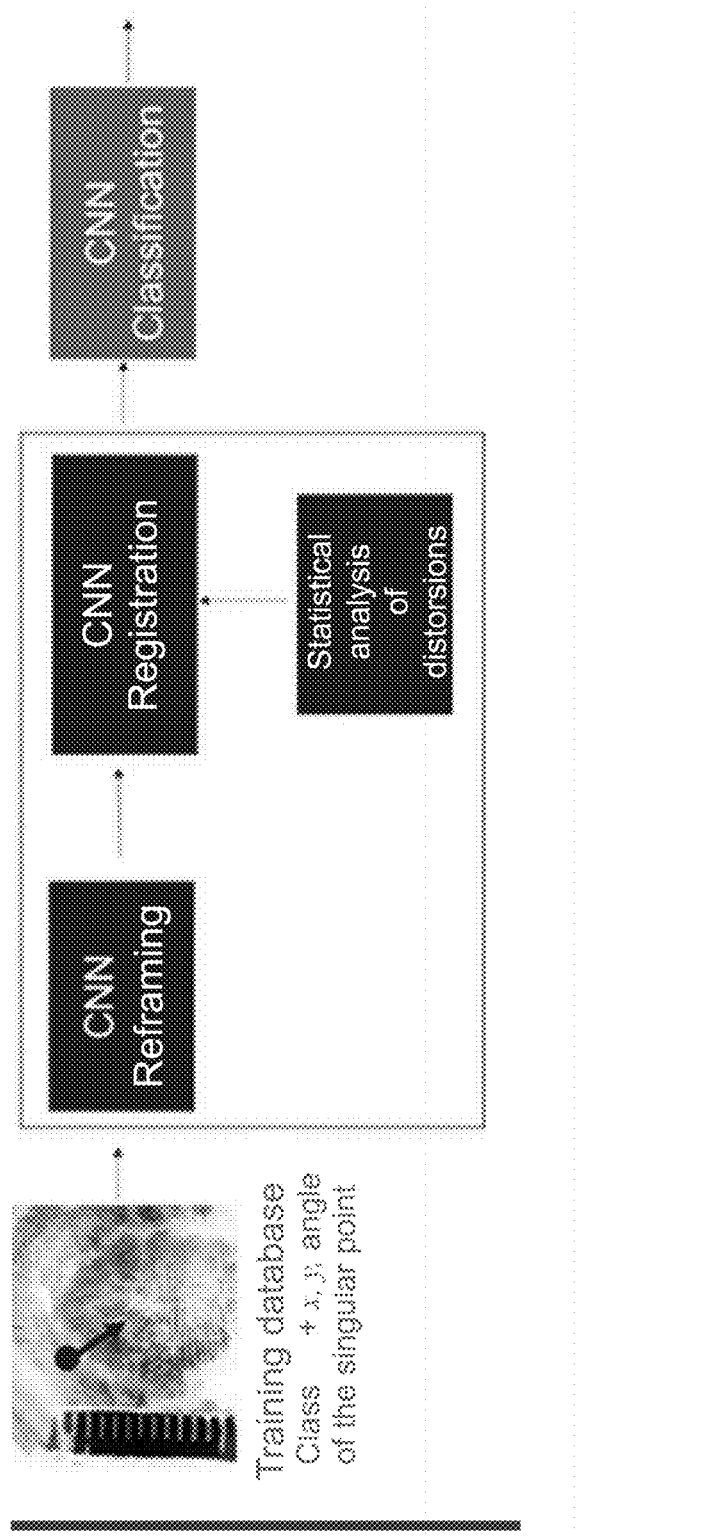
FIG. 5 shows the training of a CNN in a preferred embodiment of the method according to the invention.

As illustrated in FIG. 5, in the case of a third CNN, the training images are also already associated with reference values of the parameters of the singular point, i.e. the position and orientation of the singular point are known. It should be noted that as explained, official databases generally only have images that are already properly oriented; the data are therefore advantageously augmented so as artificially to generate images with varied positions and orientations of the singular point, from original images. Moreover, the increase of additional data can advantageously be done in the form of random occultations. Thus, even in case of a potentially hidden (and therefore absent) singular point, the third CNN is capable of inferring the position of the most probable singular point.

Conversely, the training images are not associated with transformation parameters, i.e. the images are only associated with their class and possibly parameters representative of the singular point, which facilitates obtaining such a database. Alternatively, it should be noted that the increase can be implemented with transformations as described in patent application FR1855170.

In the preferred case of transformation parameters presumably unknown in the training database, at least the first and second CNN's are trained simultaneously and semi-supervised. More specifically, as a result the two CNN's are used with on-the-fly generation of a registered image for each input training image, and it is the first CNN which, by minimizing a loss function, propagates the updates on the parameters of the second CNN. It is understood that the loss function is minimal whereupon the transformation made as a result of the second CNN allows to obtain a registered image that is more easily identifiable by the first CNN, i.e. that conforms as much as possible with the common reference frame, so that in spite of the absence of field truth in relation to the transformation parameters, the training of the second CNN does not pose any difficulty.

To do this, the second CNN can advantageously comprise a layer called Spatial Transform (see the document M. Jaderberg, K. Simonyan & A. Zisserman, (2015). *Spatial transformer networks. In Advances in neural information processing systems* (pp. 2017-2025)), which, placed between the first and second CNN, allows to propagate more easily the updates of the weights of the first CNN to the second CNN in a semi-supervised way.

It should be noted that the third CNN can also be trained simultaneously, so that the second CNN takes training images that are already reframed as input.

Family of Reference Nonlinear Deformation Functions

As explained, in a preferred manner said transformation defined by said estimated transformation parameters vector comprises a deformation (the nonlinear component of the transformation) expressed from said family of reference nonlinear deformation functions and associated coefficients.

In a preferred way, step (a0) preliminarily comprises the prior determination of said family of reference nonlinear deformation functions (before training the second CNN by using said family; see FIG. 5). To do this, a statistical analysis of said database of already classified training images is performed.

As explained, said transformations observed in the training database are nonlinear transformations with which to map from one member of a training image pair to the other where the pair is representative of a single biometric trait, i.e. of similar identity (associated with the same class).

Therefore, it can be assumed that the database comprises N pairs of images representative of a single trait. It should be noted that, for example if there are three images representative of a single trait, it can be seen as two pairs, and so on.

Furthermore, geometric transformations are determined with which to map from one member to the other of a training data pair representative of a single biometric trait (and to do so preferably for all possible pairs so as to obtain the N transformations).

To do that, a (first) distortion field (non-diffeomorphic) can be defined, represented for example by a "Thin Plate Spline" (TPS) by applying for example the method described in the document by A. Ross, S. C. Dass, and A. K. Jain (2004) *Estimating Fingerprint Deformation.* In: Zhang D., Jain A. K. (eds) *Biometric Authentication. Lecture Notes in Computer Science*, vol 3072. Springer, Berlin, Heidelberg, and making it diffeomorphic (i.e. a second distortion field is obtained that is diffeomorphic this time) and by a regularization technique consisting of eliminating possible folds for each point of the distortion field.

From there, said statistical analysis is preferably a principal components analysis on all of the distortion fields expressing the transformations observed in the training database, the reference nonlinear deformation functions being determined from eigenvectors produced from the principal components analysis (PCA).

For example, if working on velocity fields (by taking the logarithm of the distortion fields), the PCA enables a database of N−1 velocity fields to be obtained $E_{i, i \in [0;N-2]}$ enabling the N observed velocity fields to be written as a linear combination $\Sigma_{i=0}^{N-2} \alpha_i E_i$. The k<N first velocity fields obtained by the PCA represent the most significant variabilities and it is therefore possible to evaluate one velocity field between two images solely with said k first $E_{i, i \in [0;k-1]}$, so that they can constitute the family of reference nonlinear deformation functions. In other words, said reference nonlinear deformation functions are the k first eigenvectors of all the velocity fields observed in the training database. Being limited to k functions greatly simplifies the training of the second CNN, although without losing any robustness.

Computer Program Product

According to a second and third aspect, the invention relates to a computer program product comprising code instructions for execution (in particular on data processing means 11, 21 of the server 1 and/or of the client 2) of a method of classification of an input image representative of a biometric trait by a first CNN, as well as storage means readable by computer equipment (a memory 12, 22 of the server 1 and/or of the client 2) on which said computer program product is located.

The invention claimed is:

1. A method of classification of an input image representative of a biometric trait by means of a first convolutional neural network, CNN, characterized in that it comprises the implementation, by data processing means (21) of a client (2), of steps of:
   (a) estimation of a vector of parameters that are descriptive of a singular point of the biometric trait in said input image, by means of a third CNN;
   (b) reframing said input image based on estimated parameters of said singular point, so that the parameters of said singular point have predetermined values for the reframed input image;
   (c) estimation of a transformation parameter vector of said input image, by means of a second CNN, the parameters of the vector being representative of a geometric transformation enabling the biometric trait represented by the input image to be registered in a common reference frame;

(d) application to said reframed input image of a transformation defined by said estimated transformation parameter vector, so as to obtain a registered input image;

(e) classification of the registered input image by means of the first CNN.

2. The method according to claim 1, wherein said biometric traits are chosen from among fingerprints, faces and irises, particularly fingerprints.

3. The method according to claim 1, wherein said transformation parameters comprise at least one set of deformation coefficients each associated with a reference nonlinear deformation function from a family of reference nonlinear deformation functions, said transformation defined by said estimated transformation parameters vector comprising a deformation expressed from said family of reference nonlinear deformation functions and associated coefficients.

4. The method according to claim 3, wherein said reference nonlinear deformation functions are velocity fields ($E_i$), said deformation being expressed in the form of a diffeomorphic distortion field (T) as an exponential of a linear combination ($T=\exp(\Sigma_{i=0}^{k-1} c_i E_i)$) of the velocity fields ($E_i$) weighted by said associated coefficients ($c_i$).

5. The method according to claim 3, wherein said transformation parameters further comprise a rotation parameter and/or a change of scale parameter and/or at least one translation parameter.

6. The method according to claim 5, wherein said transformation defined by said estimated transformation parameters vector comprises a composition of said deformation with an affine transformation expressed from corresponding transformation parameters.

7. The method according to claim 1, wherein said transformation parameters comprise at least one coordinate of the singular point and an angle of the singular point, said reframing of the input image comprising a translation and/or a rotation.

8. The method according to claim 1, comprising a prior training step (a0), by data processing means (11) of a server (1), from a database of training images already classified, from parameters of said first and second CNNs.

9. The method according to claim 8, wherein the first and second CNNs are trained simultaneously and semi-supervised, the training images from the database of training images not being associated with transformation parameters.

10. The method according to claim 1, wherein the step (a0) also comprises the training of the third CNN, the training images from the database of training images being associated with parameters that are descriptive of a singular point.

11. The method according to claim 9, wherein the training of the first and second CNNs comprises, for at least one training image from said training image database, obtaining a registered training image, classifying the registered training image, and minimizing a loss function.

12. The method according to claim 8, wherein the step (a0) preliminarily comprises the statistical analysis of said database of already classified training images, so as to determine said family of reference nonlinear deformation functions by which transformations observed in the training database can be expressed based on a set of coefficients.

13. The method according to claim 12, wherein said transformations observed in the training database are nonlinear transformations with which to map from one member of a training data pair to the other where the pair is representative of a single biometric trait.

14. The method according to claim 12, wherein said statistical analysis is a main component analysis on all the distortion fields expressing the transformations observed in the training database, the reference nonlinear deformation functions being determined as velocity fields defined by eigenvectors produced from the main component analysis.

15. The method according to claim 1, wherein said biometric trait represented by the input image is that of an individual, step (e) being a step of identification or authentication of said individual.

16. A non-transitory computer readable program product comprising code instructions for the execution of a method according to claim 1 of classification of an input image representative of a biometric trait by means of a first convolutional neural network, CNN, when said program is executed by a computer.

17. A non-transitory storage means readable by computer equipment on which a computer program product comprises code instructions for the execution of a method according to claim 1 of classification of an input image representative of a biometric trait by means of a convolutional neural network, CNN.

* * * * *